T. R. BINGHAM.
Gage-Cock.

No. 213,033  Patented Mar. 11, 1879.

UNITED STATES PATENT OFFICE.

THOMAS R. BINGHAM, OF PITTSBURG, PENNSYLVANIA.

IMPROVEMENT IN GAGE-COCKS.

Specification forming part of Letters Patent No. 213,033, dated March 11, 1879; application filed November 23, 1878.

*To all whom it may concern:*

Be it known that I, THOMAS R. BINGHAM, of the city of Pittsburg, in the county of Allegheny and State of Pennsylvania, have invented a new and useful Improvement in Gage-Cocks, which improvement is fully described in the following specification and accompanying drawings.

My invention relates to that class of gage-cocks in which the valve and stem are caused to revolve by the force of the current of steam or water passing through the cock, with the intention of preventing the clogging of the cock by mud, and also to change the seating of the valve.

Heretofore such gage-cocks have been constructed with the revolving mechanism in front of the valve-seat and inclosed in the passage-way of the cock, which, in some cases, is enlarged into a chamber. The objection to this mode of construction is that the mud or other mineral substances in the water or steam which may be in transit in the passage-way at the instant the valve is seated or closed remain in the said passage-way, and, losing their moisture, become firmly attached to, or burned, or incrusted on the propelling or revolving mechanism, so as to gradually fill any openings in it, and thus destroy its action, and finally render the cock worthless on account of its becoming completely filled with said incrustations.

The object of my invention is to make a self-grinding gage-cock, and also to prevent incrustations from forming on the revolving mechanism, and to preserve the valve and its seat from cutting out, by constantly changing the valve in its position on its seat.

The invention consists in the arrangement of a chamber, containing revolving mechanism, in the rear of the valve-seat, to which the steam or water has constant access; the placing the revolving mechanism in said chamber and in constant contact with the water or steam; the turning the valve and stem on its axis by mechanism behind the valve, so that the passage-way of the cock is constantly ground out by the stem revolving therein, and the valve and its seat change their relative position the one to the other; the forming the head so that friction will be reduced, and the revolving of the stem will not be impeded by the bearing or contact of the gage-stick on the head.

Figure 1:
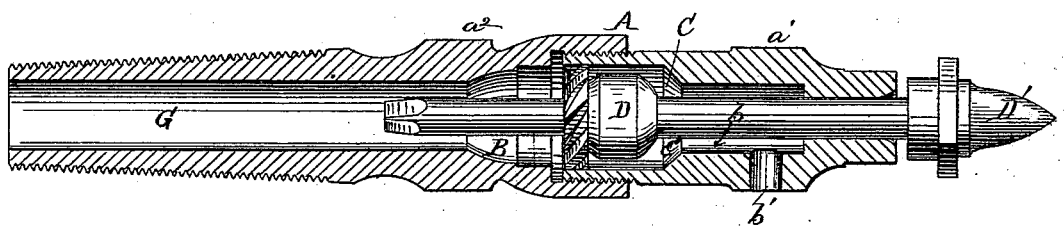
Figure 2:
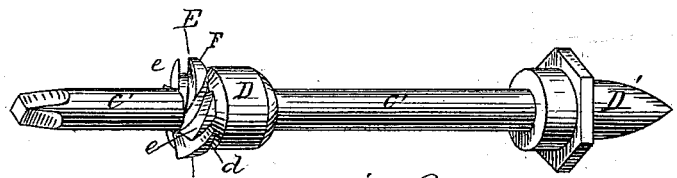

In the accompanying drawings, in which similar letters of reference indicate like parts, Figure 1 is a longitudinal section of the invention. Fig. 2 is a perspective of the stem, valve, and its revolving mechanism removed from the cock.

A is the gage-cock, constructed in two parts, $a^1$ being the front, and $a^2$ the rear, portion, or that which screws into the boiler. The front, $a^1$, screws into the front of $a^2$, as is shown. It is provided with the usual longitudinal passage-way and outlet for the steam or water, and the stem, as shown by $b$ and $b'$. Said passage-way terminates in the chamber B, the front wall of which, around the opening of the passage-way, forms the valve-seat C. The chamber B is about twice the diameter of said passage-way, and of such length as to contain the valve and propelling mechanism, in which C′ is the stem; D, the valve, fast on the stem; D′, the head, which should be made of hard metal and of such form as will terminate in a small bearing-point, the preferable form being as shown.

E is a small wheel, about one-eighth of an inch thick and of such diameter that it will fit into the chamber B, and yet freely revolve or move longitudinally in it. It is fast on the stem just behind the valve D, from which it is separated by a slight groove cut around the body of the valve, as shown by $d$. The face or periphery of the wheel E is cut by a number of spiral slots, $e\ e\ e$, which form passage-ways from the back to the front of said wheel, that portion of the wheel between the slots $e\ e$ forming a series of wings or arms, F F.

G is a rear passage-way, bored longitudinally through the rear piece, $a^2$, and extends from the chamber B to the rear end of the cock.

Operation: The cock being in connection with a steam-boiler, the pressure of the steam forces the valve D on its seat in the usual way and closes the passage $b$, and the chamber B is filled with either steam or water, dependent on the location of the cock in the boiler. The wheel E is surrounded by the steam or water and kept moist, so that no incrustation of mineral substances forms on it or in the slots e e e. On applying the gage-stick to the cone-shaped head and pushing the valve back off of its seat, the steam or water rushes through the slots e e e, impinging on the wings F F of the wheel, and causes it to rapidly revolve, so that the stem C' in the passage-way b grinds out any mud which may be on the walls thereof, or on said stem. Just as the valve closes (on removal of the pressure on the gage-stick) the valve will slightly turn on its seat, thus grinding the one to the other, and also changing its position on the seat, so as to prevent cutting of the same.

Having thus described my invention and its operation, what I claim, and desire Letters Patent for, is—

1. A gage-cock constructed substantially as described, whereby the power which causes the valve and stem to revolve on their axis is applied to revolving mechanism on the valve-stem behind the valve and its seat, constructed and arranged as and for the object set forth.

2. A gage-cock having a series of spiral grooves and wings on the valve-stem behind the valve, and constructed so that the action of the steam or water passing through the cock will cause the stem to rotate or revolve on its axis, constructed and arranged as and for the object specified.

3. In a gage-cock, the propeller-wheel E on the valve-stem C', behind the valve, and inclosed in a steam and water chamber, all constructed and arranged as and for the object specified.

4. In a gage-cock, a steam and water chamber located in the rear of the valve-seat, in which is contained a series of spiral grooves and wings, which operate to rotate the valve-stem on its axis, constructed and arranged as and for the object specified.

5. In a gage-cock provided with a revolving stem, the hard-metal head D', as and for the object set forth.

6. In a gage-cock, the combination of an inclosing-chamber, B, a series of spiral grooves, e e, and wings F on the stem C', all constructed and arranged for operation as shown and described.

7. A gage-cock having the chamber B, stem C', valve-seat C, valve D, and wheel E, all constructed and arranged as and for the object set forth.

THOS. R. BINGHAM.

Witnesses:
WM. M. CUTHBERT,
LOUIS B. FULTON.